Feb. 2, 1926.                                                    1,571,203
                            L. J. KASS
                          MECHANICAL TOY
                        Filed May 23, 1925
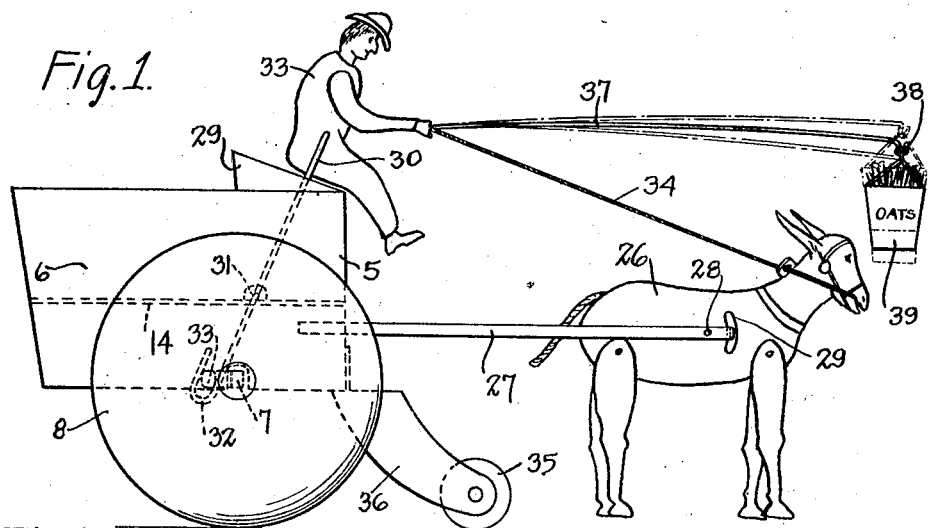
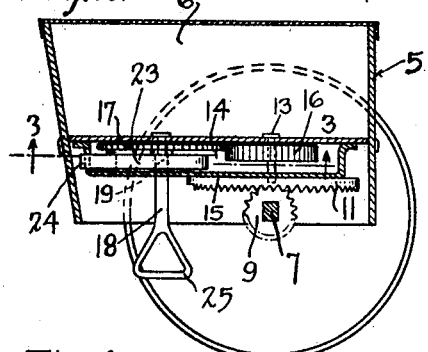
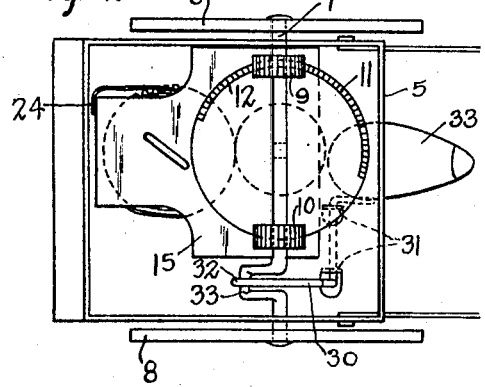
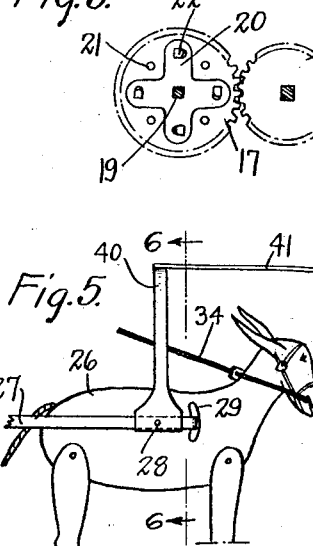
Inventor
Louis J. Kass
By his Attorney Patented Feb. 2, 1926.

1,571,203

UNITED STATES PATENT OFFICE.

LOUIS J. KASS, OF NEW YORK, N. Y., ASSIGNOR TO THE FERDINAND STRAUSS CORPORATION, OF NEW YORK, N. Y., A CORPORATION OF NEW YORK.

MECHANICAL TOY.

Application filed May 23, 1925. Serial No. 32,258.

*To all whom it may concern:*

Be it known that I, LOUIS J. KASS, a citizen of the United States of America, residing at New York city, county of New York, and State of New York, have invented certain new and useful Improvements in Mechanical Toys, of which the following is a specification.

This invention relates to mechanical toys and in particular to a feature adapted to be embodied in toys having a movable figure, as a part thereof.

A particular object of the invention is to provide the toy with an imitation bait or the like as in toys having a balking mule, so arranged that the bait will have a tendency to bob up and down and thereby amuse children during the operation of the toy.

A further object of the invention is to so arrange the bait that it will have the appearance of first being within reach of the animal's mouth and then it will move away, the various movements to the bait being imparted through the medium of a moving figure or part of the toy and the spring like construction of the bait holding pole or member.

Referring to the drawing wherein I have shown preferred embodiments of my invention:—

Figure 1 is a side view of a toy showing the arrangement of the bait and its various positions in outline.

Figure 2 is a side elevation of the body of the toy in section showing the operating mechanism, Figure 3 is a section taken on the line 3—3 of Figure 2, Figure 4 is a bottom plan view of the vehicle body showing part of the operating mechanism, Figure 5 is a side view of the animal and a portion of the shafts showing how the bait is suspended in another manner so that it will dangle before the animal; and, Figure 6 is a section on the line 6—6 of Figure 5.

Referring to the drawing in detail 5 indicates the body of the vehicle through the sides 6 of which passes the axle 7 carrying at its ends the wheels 8, which propel the toy first forward and then backward through the medium of the spaced pinions 9 and 10 which are fixed to the axle 7 and are driven alternately by gear 11 having interrupted teeth 12. The gear 11 is carried on the lower end of a shaft 13 which extends through the bottom 14 of the body and through the housing 15, in the latter of which is disposed the motor mechanism. Within this housing, the shaft 13 carries the pinion 16 which is driven by the gear 17 carried revolvably on the end of a key shaft 18. The shaft is squared as at 19 in the portion beyond the gear 17 and carries a ratchet plate 20 which lies against and rides over the flat face of the gear 17 in which are provided openings 21 into which fit lips 22 punched out of the plate 20. A coil spring 23 is fastened to plate 20 at one end and at its other end to the housing 15 as at 24. The end of the key shaft 18 is provided with a finger piece 25 by which the spring may be wound up. It is evident that the plate 20 will ratchet over the gear 17 in its winding movement but will carry the gear with it to operate the toy during its unwinding movement. The gear 11 will cause the toy to have a backward and forward movement to simulate the balking of a mule, and the animal 26 carried in the shafts 27 is made in imitation of a mule, the same being pivoted as at 28 rearwardly of its center, to the shafts, while the forward end of the latter passes through suitable slots 29 in the sides of the animal figure 26, the slots allowing for rocking movement of the figure about its pivot point 28.

The body of the vehicle is provided with a seat 29 through which passes a rock lever 30, the same being pivotally carried in the lips 31 punched out of the bottom 14, and having its lower end hooked as at 32 about an offset 33 in the axle 7. A revolving movement of the axle therefore throws the upper end of lever 30 back and forth and causes the figure 33 carried on the upper end of the lever to simulate a driver pulling on the reins, in this instance a cord or the like 34 being connected from the hand of the figure 33 to the mule figure 26 so that a rearward movement of the figure 33 causes a raising movement of the front of figure 26.

The front of the body of the vehicle is provided with a single pilot wheel 35 which is carried in the bracket 36, suitably attached to the body 5.

The figure 33 of the man on the seat is provided with a forwardly extending pole like member 37 which is made of a piece of springy wire. This wire extends to a point beyond and over the animal's head, and supports at its end in the loop 38, the bucket 39 in which is placed an imitation of feed such as hay, oats or the like. The bucket might be replaced by an imitation bale of hay or any suitable simulation of fodder.

When the figure 33 is thrown back and forth, it is evident that the spring like member 37 will move up and down, and at the same time have an independent vibratory movement which will dangle and swing the bucket 39 in front of the head of the animal thus providing a continuously moving feature which will be life-like and will amuse children.

Instead of having the pole member attached to the hands of figure 33 I may provide a yoke 40 on the forward end of the shafts 27 of inverted U-shape and secure thereto as by soldering or in any suitable manner the pole or extension 41 which will be made of spring wire carrying at its end the bucket 42 as before described. The movements of the cart will of course cause a vibratory movement of the bucket.

It is evident therefore, that I have provided an interesting feature in combination with toys and one which will afford amusement to children.

Having described my invention what I claim is:—

1. A toy comprising a cart member, a figure mounted thereon, an animal figure disposed forwardly of said cart, means for causing forward and rearward movement of said cart, and a pole member extending from the figure on the cart, a container carried on the end of said pole member, said pole member being made of spring material whereby the same will vibrate upon a movement of said cart.

2. A toy comprising a cart member, a rocking figure mounted thereon, an animal figure disposed forwardly of said cart, means for causing movement of said cart, a spring-like pole associated with said cart and extending forwardly thereof, said pole being adapted for vibratory movement, and a freely suspended member on the forward end of said pole for simulating bait.

LOUIS J. KASS.